(12) United States Patent
Kim (10) Patent No.: US 7,825,717 B2
(45) Date of Patent: Nov. 2, 2010

(54) ELECTRONIC APPARATUS AND CONTROL METHOD THEREOF

(75) Inventor: Kyoung-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1132 days.

(21) Appl. No.: 11/480,898

(22) Filed: Jul. 6, 2006

(65) Prior Publication Data

US 2007/0009183 A1    Jan. 11, 2007

(30) Foreign Application Priority Data

Jul. 7, 2005    (KR) .......................... 10-2005-61087

(51) Int. Cl.
H03K 17/00    (2006.01)

(52) U.S. Cl. ..................................... 327/415

(58) Field of Classification Search ................. 327/415
See application file for complete search history.

(56) References Cited

U.S. PATENT DOCUMENTS

| | | | |
|---|---|---|---|
| 5,559,964 A | 9/1996 | Klimek et al. | |
| 6,038,670 A | 3/2000 | Oh | |
| 6,134,612 A * | 10/2000 | Bailey et al. | 710/62 |
| 7,414,606 B1 * | 8/2008 | Wong et al. | 345/100 |
| 2004/0119731 A1 * | 6/2004 | Lee | 345/699 |
| 2010/0128178 A1 * | 5/2010 | Yun et al. | 348/558 |

FOREIGN PATENT DOCUMENTS

| | | |
|---|---|---|
| CN | 1503896 | 6/2004 |
| JP | 9-270944 | 10/1997 |
| JP | 2003-029729 | 1/2003 |
| KR | 2001-39050 | 5/2001 |
| KR | 2003-12815 | 2/2003 |
| KR | 2004-0032271 | 4/2004 |
| KR | 2005-0005173 | 1/2005 |

OTHER PUBLICATIONS http://review.zdnet.com/product/crt-monitors/syncmaster-950b-19-inch-ivory-crt-monitor/7593005.*
Paul Horowitz and Winfield Hill, "The Art of Electronics 2nd Edition", Cambridge University Press, Cambridge, England, 1989 (no month).*

(Continued)

Primary Examiner—Lincoln Donovan
Assistant Examiner—Adam D Houston
(74) Attorney, Agent, or Firm—Stanzione & Kim, LLP (57) ABSTRACT

An electronic apparatus includes a main output part to output an image signal, a sub output part to output the image signal to an external apparatus, a connecting sensor to sense whether the external apparatus is connected to the sub output part, and an image processor to output the image signal to the main output part when the external apparatus is not connected to the sub output part and to the sub output part when the external apparatus is connected to the sub output part, depending on a sensing result of the connecting sensor. Accordingly, the electronic apparatus is capable of automatically outputting the image signal to the external apparatus in the case in which the electronic apparatus is connected to the external apparatus.

28 Claims, 4 Drawing Sheets

OTHER PUBLICATIONS http://reviews.cnet.com/laptops/lenovo-thinkpad-t41-2379/4504-3121_7-30567436.html.*
http://stuff.silverorange.com/archive/2004/may/ibmthinkpadport.*
Korean Office Action dated Mar. 29, 2007 issued in KR 2005-61087.
Chinese Office Action issued Jun. 5, 2009 in CN Application No. 2006101054112.
Chinese Office Action dated Jul. 25, 2008 issued in CN 2006101054112.
Korean Office Action dated Sep. 29, 2006 issued in KR 2005-61087.

* cited by examiner

| Pin | Signal | Pin | Signal | Pin | Signal |
|-----|--------|-----|--------|-----|--------|
| 1 | Red | 6 | Red Ground | 11 | Ground |
| 2 | Green | 7 | Green Ground | 12 | DCC data |
| 3 | Blue | 8 | Blue Ground | 13 | H sync |
| 4 | Ground | 9 | No connect | 14 | V sync |
| 5 | DCC Ground | 10 | Sync Ground | 15 | DCC Clock |

FIG. 2B

| Pin | Signal | Pin | Signal | Pin | Signal |
|---|---|---|---|---|---|
| 1 | T.M.D.S Data2- | 9 | T.M.D.S Data2- | 17 | T.M.D.S Data2- |
| 2 | T.M.D.S Data2+ | 10 | T.M.D.S Data2- | 18 | T.M.D.S Data2- |
| 3 | T.M.D.S Data2/4 shield | 11 | T.M.D.S Data1/3 shield | 19 | T.M.D.S Data0/5 shield |
| 4 | T.M.D.S Data4- | 12 | T.M.D.S Data3- | 20 | T.M.D.S Data5- |
| 5 | T.M.D.S Data4+ | 13 | T.M.D.S Data3+ | 21 | T.M.D.S Data5+ |
| 6 | DCC Clock | 14 | +5V Power | 22 | T.M.D.S Clock shield |
| 7 | DCC data | 15 | Ground(for +5V) | 23 | T.M.D.S Clock+ |
| 8 | NO connect | 16 | Hot Plug Detect | 24 | T.M.D.S Clock- |

FIG. 3

ELECTRONIC APPARATUS AND CONTROL METHOD THEREOF

CROSS-REFERENCE TO RELATED APPLICATIONS

This application claims the benefit under 35 U.S.C. §119 of Korean Patent Application No. 2005-61087, filed on Jul. 7, 2005, in the Korean Intellectual Property Office, the disclosure of which is incorporated herein in its entirety by reference.

BACKGROUND OF THE INVENTION

1. Field of the Invention

The present general inventive concept relates to an electronic apparatus and a control method thereof, and more particularly, to an electronic apparatus and a control method thereof which can output an image signal through at least a part of a main output part and a sub output part.

2. Description of the Related Art

Recently, electrical appliances using an embedded system, such as a PDA, a thin client, etc., have gained popularity. In general, the embedded system relates to a control system in which a processor is embedded in a system and is operated therein. The embedded system is typically embedded in an electronic apparatus which is integrated with hardware and software to perform a specific predetermined function.

The electronic apparatus, such as a PDA, having a built in display part can be used to connect an external apparatus, such as a projector, to an output port thereof.

However, conventional electronic apparatuses have an inconvenience in that when they are connected to the external apparatus, a user must choose whether an image signal should be output to the built in display part or the external apparatus.

SUMMARY OF THE INVENTION

The present general inventive concept provides an electronic apparatus and a control method thereof to automatically output an image signal to an external apparatus in a case in which the electronic apparatus is connected to the external apparatus.

Additional aspects of the present general inventive concept will be set forth in part in the description which follows and, in part, will be obvious from the description, or may be learned by practice of the present general inventive concept.

The foregoing and/or other aspects of the present general inventive concept are achieved by providing an electronic apparatus, comprising a main output part to output an image signal, a sub output part to output the image signal to an external apparatus, a connecting sensor to sense whether the external apparatus is connected to the sub output part, and an image processor to output the image signal to the main output part when the external apparatus is not connected to the sub output part and to the sub output part when the external apparatus is connected to the sub output part, depending on a sensing result of the connecting sensor.

The main output part may comprise a display part, and the image processor may output the image signal to the display part when the external apparatus is not connected to the sub output part.

The sub output part may comprise an output port having a predetermined sensing pin connector, and the connecting sensor may sense whether the external apparatus is connected to the sensing pin connector.

The sensing pin connector may be at least one of a ground pin connector and an unused pin connector among a plurality of pin connectors provided in the output port.

The sensing pin connector may be released from a grounding state when the external apparatus is connected to the output port, and the connecting sensor may sense whether the sensing pin connector is released from the grounding state.

The output port may comprise at least one of a D-sub port and a DVI port.

The connecting sensor may comprise a pull up resistor to output a pull up signal as a sensing signal depending on a state of the sensing pin connector.

The foregoing and/or other aspects of the present general inventive concept are also achieved by providing an electronic apparatus capable of displaying an image signal and connectable to an external device, comprising a sensing unit to sense whether the electronic apparatus is connected to the external device, and a control unit to control the electronic apparatus to display the image signal when the sensing unit senses that the electronic apparatus is not connected to the external device and to transmit the image signal to the external device when the sensing unit senses that the electronic apparatus is connected to the external device.

The foregoing and/or other aspects of the present general inventive concept are also achieved by providing an electronic apparatus, comprising an output unit to output a signal, a connection unit connectable to at least one external device to transmit the signal to the external device, a sensing unit to determine whether the external device is connected to the connection unit, and a control unit to selectively transmit the signal to one of the output unit and the connection unit according to the determination of the sensing unit.

The foregoing and/or other aspects of the present general inventive concept are also achieved by providing a method of controlling an electronic apparatus having a main output part and a sub output part, comprising outputting an image signal, sensing whether a predetermined external apparatus is connected to the sub output part, outputting the image signal to the main output part when the external apparatus is not connected to the sub output part according to the sensing result, and outputting the image signal to the sub output part when the external apparatus is connected to the sub output part according to the sensing result.

The sub output part may comprise a predetermined sensing pin connector, and the sensing whether the predetermined external apparatus is connected to the sub output part may comprise allowing the sensing pin connector to remain in a grounding state when the external apparatus is not connected to the sub output part.

The sensing whether the predetermined external apparatus is connected to the sub output part may further comprise releasing the sensing pin connector from the grounding state when the external apparatus is connected to the sub output part, and sensing whether the sensing pin connector is released from the grounding state.

The foregoing and/or other aspects of the present general inventive concept are also achieved by providing a control method of displaying an image, comprising sensing whether an external device is connected to an electronic apparatus, transmitting an image signal to the external device when it is sensed that the external device is connected to the electronic apparatus, and displaying the image signal at the electronic apparatus when it is sensed that the external device is not connected to the electronic apparatus.

The foregoing and/or other aspects of the present general inventive concept are also achieved by providing a control method of displaying an image, comprising transmitting an image signal to a display of an electronic apparatus to be displayed thereon, continuously sensing whether an external device is connected to an output port of the electronic apparatus, and when it is sensed that an external device is connected to the output port of the electronic apparatus, interrupting the image signal transmitted to the display of the electronic apparatus and transmitting the image signal to the external device through the output port of the electronic apparatus.

The foregoing and/or other aspects of the present general inventive concept are also achieved by providing a computer readable recording medium having executable codes to perform a method of controlling an electronic apparatus having a main output part and a sub output part, the method comprising outputting an image signal, sensing whether a predetermined external apparatus is connected to the sub output part, outputting the image signal to the main output part when the external apparatus is not connected to the sub output part depending on a sensing result, and outputting the image signal to the sub output part when the external apparatus is connected to the sub output part depending on the sensing result.

The foregoing and/or other aspects of the present general inventive concept are also achieved by providing a computer readable recording medium having executable codes to perform a control method of displaying an image, the method comprising sensing whether an external device is connected to an electronic apparatus, transmitting an image signal to the external device when it is sensed that the external device is connected to the electronic apparatus, and displaying the image signal at the electronic apparatus when it is sensed that the external device is not connected to the electronic apparatus.

The foregoing and/or other aspects of the present general inventive concept are also achieved by providing a computer readable recording medium having executable codes to perform a control method of displaying an image, the method comprising transmitting an image signal to a display of an electronic apparatus to be displayed thereon, continuously sensing whether an external device is connected to an output port of the electronic apparatus, and when it is sensed that an external device is connected to the output port of the electronic apparatus, interrupting the image signal transmitted to the display of the electronic apparatus and transmitting the image signal to the external device through the output port of the electronic apparatus.

BRIEF DESCRIPTION OF THE DRAWINGS

These and/or other aspects of the prevent general inventive concept will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept while referring to the figures.

Figure 1:
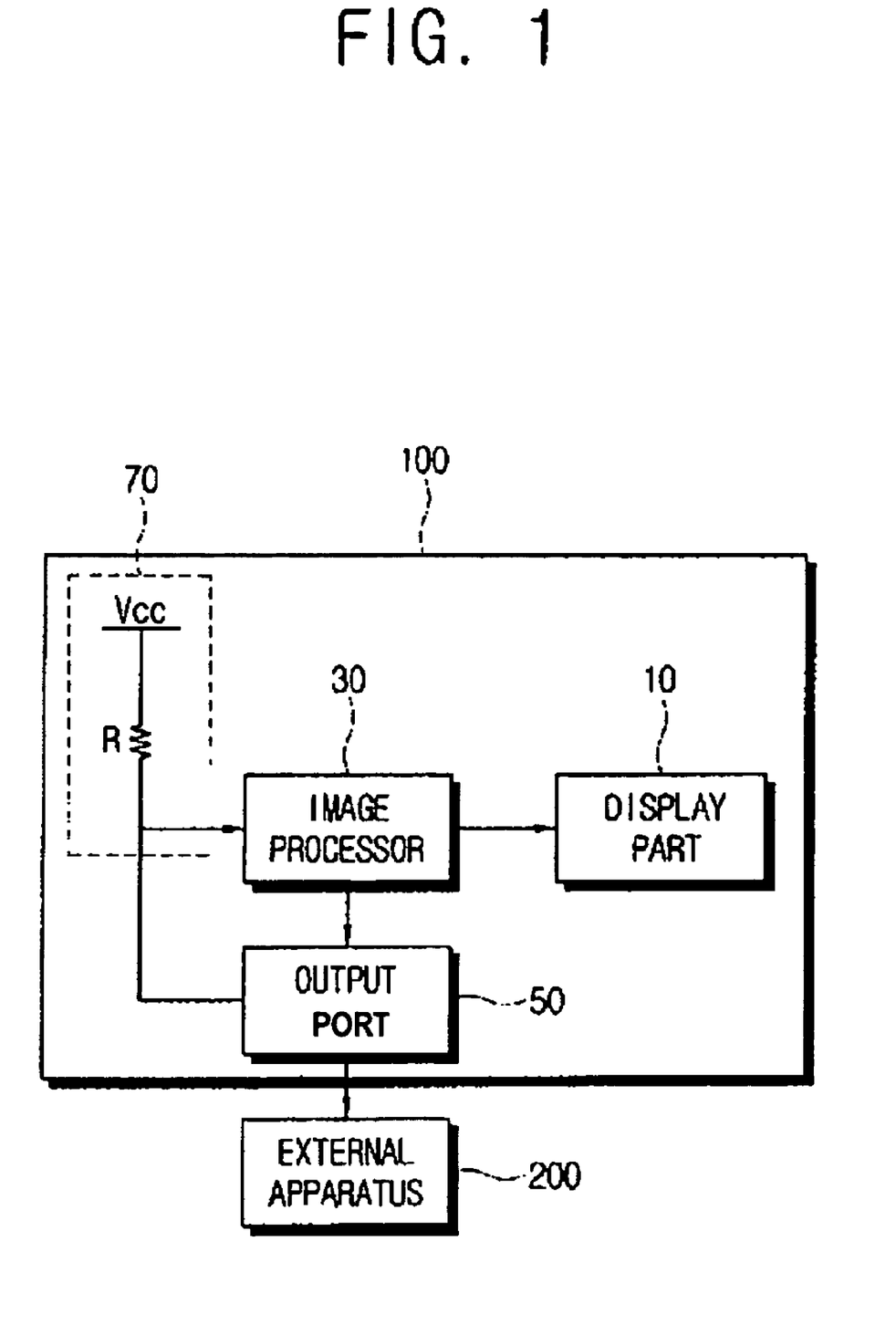
FIG. 1 is a schematic control block diagram illustrating an electronic apparatus according to an embodiment of the present general inventive concept.

FIG. 1 illustrates an electronic apparatus 100 according to an embodiment of the present general inventive concept. Referring to FIG. 1, the electronic apparatus 100 comprises a main output part, a sub output part to output a predetermined image signal to an external apparatus 200, a connecting sensor 70 to sense whether the external apparatus 200 is connected to the sub output part 50, and an image processor 30 to control the main output part, the sub output part, and the connecting sensor 70. In the present embodiment, the main output part is embodied as a display part 10 and the sub output part is embodied as an output port 50, but the present general inventive concept is not limited thereto. Hereinafter, the main output part and the sub output part will be referred to as the display part 10 and the output port 50, respectively.

In a case in which the external apparatus 200 is not connected to the output port 50, the electronic apparatus 100 outputs an image signal processed by the image processor 30 to the display part 10.

The electronic apparatus 100 can output the image signal to the output port 50 as well as to the display part 10.

When the external apparatus 200 is connected to the output port 50, the image processor 30 outputs the image signal to the external apparatus 200 through the output port 50. The output port 50 and the external apparatus 200 can communicate with each other through Display Data Channel (DDC) interface standard, such as a DDC-CI interface standard, but the present general inventive concept is not limited thereto. The output port 50 may be one of various types capable of connecting to the external apparatus 200. For example, the output port 50 may be one of various types of communication ports capable of transmitting/receiving the image signal, such as a D-sub port, a DVI port, etc.

Figure 2A:
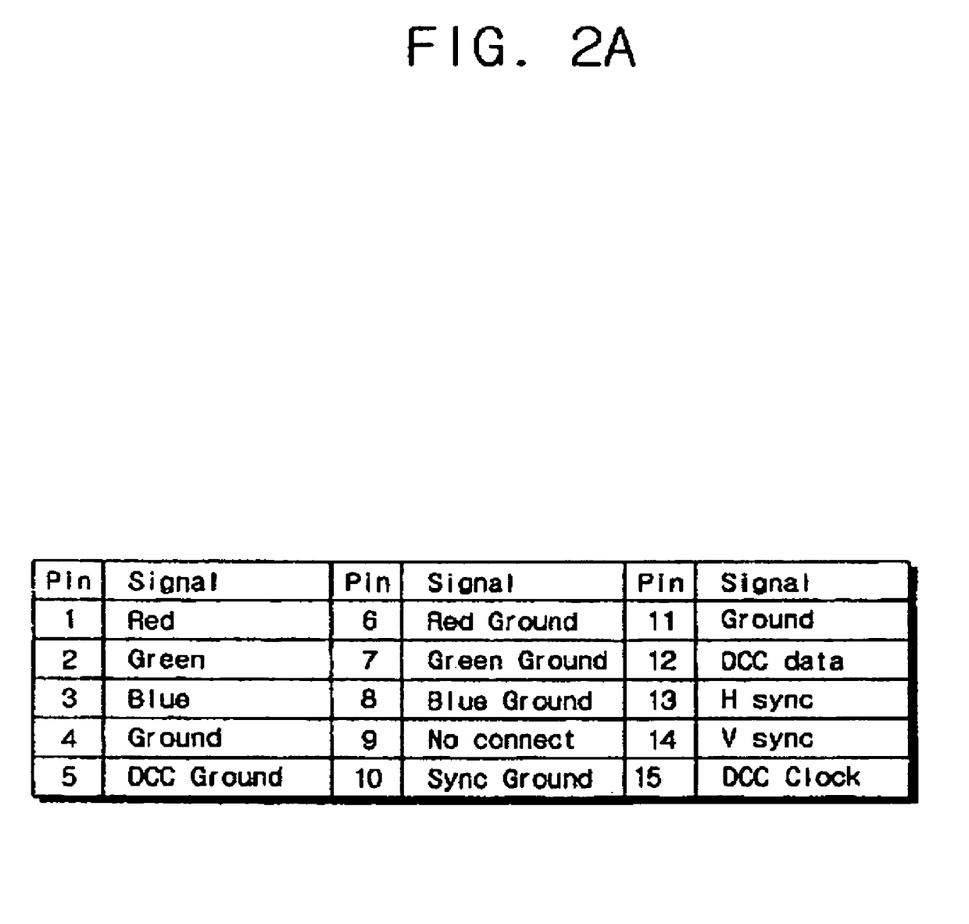
FIG. 2A is a configuration diagram illustrating pin connectors provided in a connecting port of a D-sub connector.

The D-sub port has an array of pin connectors. FIG. 2A illustrates functions of first through fifteen pin connectors of the D-sub port. Referring to FIG. 2A, the first through third pin connectors transmit RGB signals. The twelfth pin connector transmits DDC data. The thirteenth and fourteenth pin connectors transmit a horizontal synchronizating signal and a perpendicular (i.e., vertical) synchronizating signal, respectively. The fifteenth pin connector transmits a DDC clock. The ninth pin connector is an unused pin connector. The fourth through eighth pin connectors, the tenth pin connector, and the eleventh pin connector are grounding pin connectors. When a signal transmitted to the D-sub port is unnecessary, the unnecessary signal flows out through one of the grounding pin connectors so that data is transmitted/received smoothly and stably.

Figure 2B:
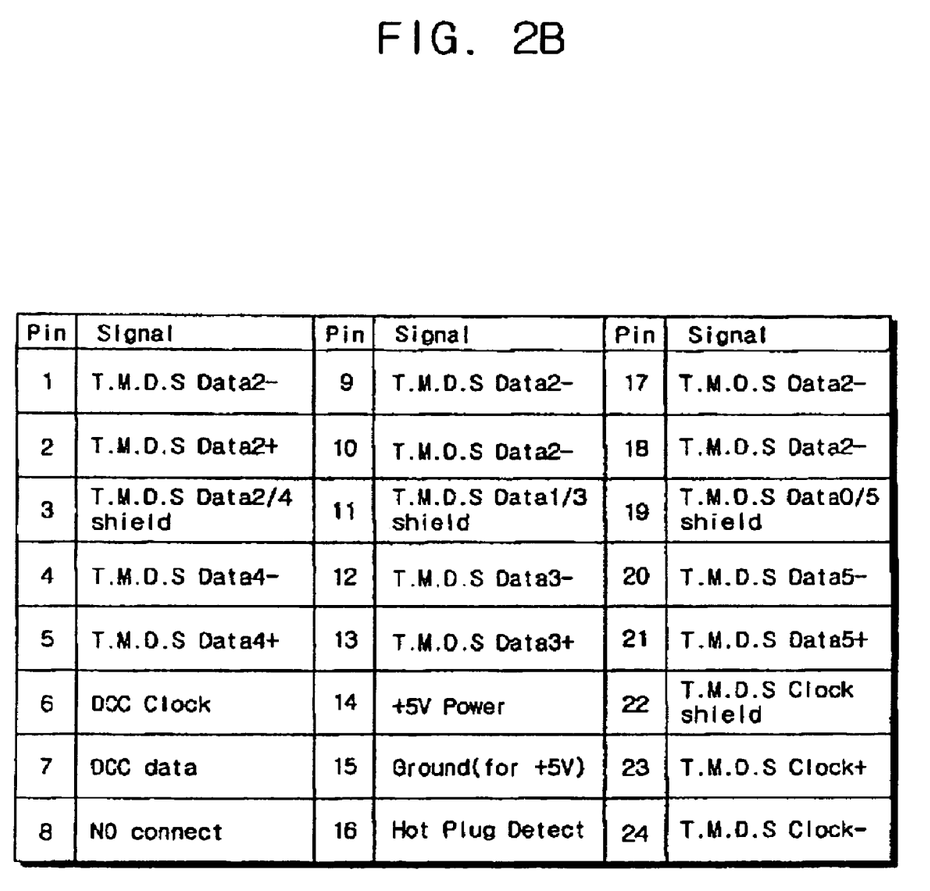
FIG. 2B is a configuration diagram illustrating pin connectors provided in a connecting port of a DVI connector.

The DVI port can be classified into a DVI-D port that transmits only digital data and a DVI-I port that transmits both digital data and analog data. FIG. 2B illustrates an example of functions of first through twenty-fourth pin connectors of the DVI-D port. Although the DVI-D port is illustrated in FIG. 2B, the present general inventive concept is not limited thereto, and the DVI-I port may be used as the output port 50 as well.

The DVI applies a transition minimized differential signaling (T.M.D.S) digital transmitting protocol and the T.M.D.S signal and a controlling signal is applied to each of the pin connectors of the DVI. Referring to FIG. 2B, the eighth pin connector of the DVI is unused, and the fifteenth pin connector is the grounding pin connector.

The connecting sensor 70 senses whether the external apparatus 200 is connected to the output port 50, and in response, outputs a sensing signal. The connecting sensor 70 may comprise a predetermined pull up resistor R connected to a voltage source Vcc, as illustrated in FIG. 1. In this case, the pull up resistor R of the connecting sensor 70 can be connected to the grounding pin connector of the output port 50, i.e. to the fourth, the fifth, or the eleventh pin connectors of the D-sub port or to the fifteenth pin connector of the DVI port. It is also possible that the unused pin connector, such as the ninth pin connector of the D-sub port or the eighth pin connector of the DVI port, may be connected to the pull up resistor R of the connecting sensor 70 instead of the grounding pin connector. The sixth, seventh, and eighth pin connectors, which are RGB grounding pin connectors of the D-sub port, may be also connected to the pull up resistor R of the connecting sensor 70. However, the fourth, fifth or eleventh pin connector of the D-sub port may be used instead of the sixth, seventh, and eight pin connectors since each of the RGB ground pin connectors is a reference of each RGB signal level.

For example, the pull up resistor R of the connecting sensor can be connected to the fifth pin connector (hereinafter, referred to as a "sensing pin connector") of the D-sub port. The sensing pin connector is in a grounding state when the external apparatus 200 is not connected to the output port 50, and electrically communicates with a pin of the external apparatus 200 when the external apparatus 200 is connected to the output port 50. Accordingly, when the external apparatus 200 is not connected to the sensing pin connector of the output port 50, no closed circuit exists between a first end of the pull up resistor R of the connecting sensor 70 and the sensing pin connector, and the connecting sensor 70 outputs a high signal to the image processor 30.

However, a closed circuit does exist between the first end of the pull up resistor R and the sensing pin connector when the external apparatus 200 is connected to the output port 50. Accordingly, the first end of the pull up resistor R is grounded through the sensing pin connector and the connecting sensor 70 outputs a low signal to the image processor 30.

The image processor 30 determines whether the external apparatus 200 is connected to the output port 50 depending on the sensing signal from the connecting sensor 70. That is, the image processor 300 determines that the external apparatus 200 is connected to the output port 50 when the connecting sensor 70 outputs the low signal and determines that the external apparatus 200 is not connected to the output port 50 when the connecting sensor 70 outputs the high signal.

The image processor 30 processes the image signal and then outputs the image signal to the display part 10 so that the display part 10 displays the image signal in the case in which the external apparatus 200 is not connected to the output port 50. On the other hand, the image processor 30 processes the image signal and then automatically outputs the image signal to the external apparatus 200 through the output port 50 in the case in which the external apparatus 200 is connected to the output port 50. In other words, the image processor 30 selectively outputs the image signal to one of the display part 10 and the output port 50 based on the sensing result of the connecting sensor 70.

It is possible that a plurality of external apparatuses 200 may be connected to the output port 50. In this case, the image processor 30 may output a priority order to the output port 50 and thereby control the output port 50 to output the image signal to one of the plurality of external apparatuses 50 determined according to the priority order.

Figure 3:
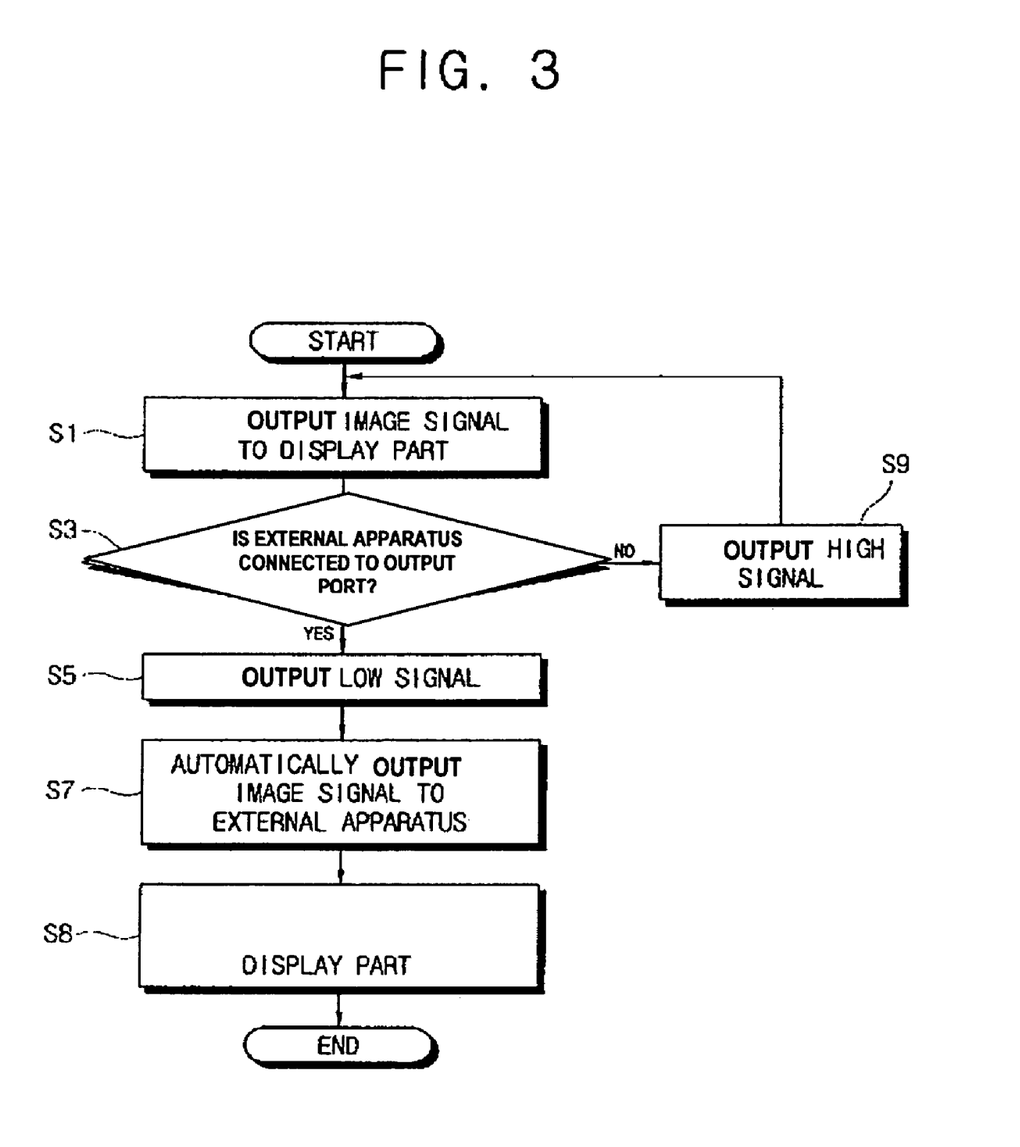
FIG. 3 is a control flowchart illustrating a controlling method of an electronic apparatus according to an embodiment of the present general inventive concept.

FIG. 3 illustrates a controlling method of the electronic apparatus 100 of FIG. 1 according to an embodiment of the present general inventive concept. Referring to FIGS. 1 and 3, the electronic apparatus 100 processes an image signal and outputs the image signal to the display part 10 at operation S1.

The connecting sensor 70 can be connected to the sensing pin connector, which can be the grounding pin connector of the output port 50. At operation S3, the connecting sensor 70 senses whether the external apparatus 200 is connected to the output port 50. When the external apparatus 20 is connected to the output port 50, the connecting sensor 70 outputs a low signal to the image processor 30 by the pull up resistor R at operation S5. When the image processor 30 receives the low signal according to the sensing result of the connecting sensor 70, the image signal is automatically output to the external apparatus 200 through the output port 50 at operation S7. When the image signal is output to the external apparatus 200, the image processor 30 interrupts the image signal that is output to the display part 10 such that the image signal is output only to the external apparatus 200 at operation S8.

The connecting sensor 70 outputs a high signal to the image processor 30 when the external apparatus 200 is not connected to the output port 50 at operation S9. When the image processor 30 receives the high signal according to the sensing result of the connecting sensor 70, the image processor 30 continuously outputs the image signal to the display part 10 (operation S1).

Furthermore, the connecting sensor 70 continuously outputs the high signal (operations S9) as long as the external apparatus 200 is not connected at operation S3.

Accordingly, the image processor 30 automatically outputs the image signal to the external apparatus 200 in the electronic apparatus 100 if the sensing signal from the connecting sensor 70 indicating that the external apparatus 200 is connected to the output port 50 is applied while outputting the image signal to the display part 10.

The embodiment of FIG. 1 illustrates that the connecting sensor 70 comprises the pull up resistor R. In this embodiment, when the external apparatus 200 is connected to the output port 50, the low signal is output, and when the external apparatus 200 is not connected to the output port 50, the high signal is output. However, the present general inventive concept is not limited to the embodiment of FIG. 1, and may be configured using various circuit designs such that a high signal or a low signal is capable of alterating the image processor 30 when the external apparatus 200 is connected to the output port 50. Furthermore, the connecting sensor 70 may be configured in various ways within the scope of the present general inventive concept so that a signal is transmitted to the image processor 30 to notify the image processor 30 as to whether the external apparatus 200 is connected to the output port 50.

In the embodiment of FIG. 1, the image processor 30 outputs the image signal to the display part 10 and the output port 50. This embodiment is illustrative of the image processor 30 outputting the image signal using at least of two outputs (i.e., a main output and a sub output). Accordingly, the present general inventive concept is not limited to the display part 10 and the output port 50, but can be applied to other various outputs as well.

It is possible for the present general inventive concept to be realized on a computer-readable recording medium as a computer-readable code. Computer-readable recording mediums include many types of recording devices that store computer system-readable data. ROMs, RAMs, CD-ROMs, magnetic tapes, floppy discs, optical data storage, etc. are used as computer-readable recording mediums. Computer-readable recording mediums can also be realized in the form of carrier waves (e.g., transmission via Internet).

As described above, when an external apparatus is connected to an electronic apparatus according to the present general inventive concept, the image signal can be automatically output to the external apparatus 200, even if a user does not separately set up a path of the image signal.

Furthermore, if an external apparatus is connected to an electronic apparatus according to the present general inventive concept, an image signal being output to a display part of the electronic apparatus can be automatically interrupted. Accordingly, a driving burden of an image processor as well as an electric power consumption of the electronic apparatus can be decreased.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
    a main output part to output an image signal;
    a sub output part to output the image signal to an external apparatus;
    a connecting sensor to sense whether the external apparatus is connected to the sub output part; and
    an image processor to output the image signal to the main output part when the external apparatus is not connected to the sub output part and to the sub output part when the external apparatus is connected to the sub output part, depending on a sensing result of the connecting sensor wherein, when the connecting sensor senses that the external apparatus is connected to the sub output part, the image processor controls the main output part to stop displaying the image signal and to transmit the image signal to the external device.

2. The electronic apparatus according to claim 1, wherein the main output part comprises a display part, and the image processor outputs the image signal to the display part when the external apparatus is not connected the sub output part.

3. The electronic apparatus according to claim 2, wherein the sub output part comprises an output port having a predetermined sensing pin connector, and the connecting sensor senses whether the external apparatus is connected to the sensing pin connector.

4. The electronic apparatus according to claim 3, wherein the sensing pin connector is at least one of a ground pin connector and an unused pin connector among a plurality of pin connectors provided in the output port.

5. The electronic apparatus according to claim 4, wherein the sensing pin connector is released from a grounding state when the external apparatus is connected to the output port, and the connecting sensor senses whether the sensing pin connector is released from the grounding state.

6. The electronic apparatus according to claim 5, wherein the output port comprises at least one of a D-sub port and a DVI port.

7. The electronic apparatus according to claim 3, wherein the connecting sensor comprises a pull up resistor to output a pull up signal as the sensing signal depending on a state of the sensing pin connector.

8. An electronic apparatus capable of displaying an image signal and connectable to an external device, comprising:
    a sensing unit to sense whether the electronic apparatus is connected to the external device; and
    a control unit to control the electronic apparatus to display the image signal when the sensing unit senses that the electronic apparatus is not connected to the external device and to transmit the image signal to the external device when the sensing unit senses that the electronic apparatus is connected to the external device wherein, when the external device is connected to electronic apparatus, the control unit controls the electronic apparatus to stop displaying the image signal, and the control unit transmits the image signal to the external device.

9. The electronic apparatus according to claim 8, wherein the sensing unit transmits one of a high signal and a low signal to the control unit when the electronic apparatus is not connected to the external device and transmits the other one of the high signal and the low signal to the control unit when the electronic apparatus is connected to the external device.

10. The electronic apparatus according to claim 8, wherein the sensing unit continuously transmits a sensing signal to the control unit indicating whether the electronic apparatus is connected the external device.

11. An electronic apparatus, comprising:
    an output unit to output a signal;
    a connection unit connectable to at least one external device to transmit the signal to the external device;
    a sensing unit to determine whether the external device is connected to the connection unit; and
    a control unit to selectively transmit the signal to one of the output unit and the connection unit according to the determination of the sensing unit wherein, when the sensing unit determines that the external device is connected to the connection unit, the control unit controls the output unit to stop outputting the signal and outputs the signal to the connection unit.

12. The electronic apparatus according to claim 11, wherein the connection unit comprises a plurality of pin connectors to connect to the external device.

13. The electronic apparatus according to claim 12, wherein the sensing unit comprises:
    a voltage source; and
    a pull up resistor connected at one end to the voltage source and connected at another end in parallel to the control unit and one of the plurality of pin connectors of the connection unit, such that the control unit receives a first voltage when the plurality of pin connectors are not connected to the external device and receives a second voltage when the plurality of pin connectors are connected to the external device.

14. The electronic apparatus according to claim 13, wherein the one of the plurality of pin connectors connected to the pull up resistor is one of a grounding pin connector and an unused pin connector.

15. The electronic apparatus according to claim 13, wherein when the control unit receives the first voltage, the control unit transmits the signal to the output unit, and when the control unit receives the second voltage the control unit transmits the signal to the connection unit.

16. The electronic apparatus according to claim 11, wherein the control unit transmits the signal to the output unit when the sensing unit determines that the external device is not connected to the connection unit and transmits the signal to the connection unit when the sensing unit determines that the external device is connected to the connection unit.

17. The electronic apparatus according to claim 11, wherein the signal is an image signal, the output unit comprises a display unit to display the image signal, and the control unit comprises an image processor to process the image signal.

18. The electronic apparatus according to claim 11, wherein when the connection unit is connectable to a plurality of external devices and the sensing unit senses that the plurality of external devices are connected to the connecting unit, the control unit determines a priority among the plurality of external devices selects one of the plurality of external devices to transmit the signal to through the connection unit according to the determined priority.

19. A method of controlling an electronic apparatus having a main output part and a sub output part, comprising:
   outputting an image signal;
   sensing whether a predetermined external apparatus is connected to the sub output part;
   outputting the image signal to the main output part when the external apparatus is not connected to the sub output part according to the sensing result; and
   outputting the image signal to the sub output part and stopping an output of the image signal to the main output part when the external apparatus is connected to the sub output part according to the sensing result.

20. The control method according to claim 19, wherein the sub output part comprises a predetermined sensing pin connector, and the sensing whether the predetermined external apparatus is connected to the sub output part comprises:
   allowing the sensing pin connector to remain in a grounding state when the external apparatus is not connected to the sub output part.

21. The control method according to claim 20, wherein the sensing whether the predetermined external apparatus is connected to the sub output part further comprises:
   releasing the sensing pin connector from the grounding state when the external apparatus is connected to the sub output part; and
   sensing whether the sensing pin connector is released from the grounding state.

22. A control method of displaying an image, comprising:
   sensing whether an external device is connected to an electronic apparatus;
   transmitting an image signal to the external device and stopping a display of the image signal at the electronic apparatus when it is sensed that the external device is connected to the electronic apparatus; and
   displaying the image signal at the electronic apparatus when it is sensed that the external device is not connected to the electronic apparatus.

23. A control method of displaying an image, comprising:
   transmitting an image signal to a display of an electronic apparatus to be displayed thereon;
   continuously sensing whether an external device is connected to an output port of the electronic apparatus; and
   when it is sensed that an external device is connected to the output port of the electronic apparatus, interrupting the image signal transmitted to the display of the electronic apparatus to stop the display of the image signal to the display of the electronic apparatus and transmitting the image signal to the external device through the output port of the electronic apparatus.

24. The control method according to claim 23, wherein the continuously sensing whether the external device is connected to the output port of the electronic apparatus comprises:
   electrically connecting a pull up resistor to a connecting pin of the output port.

25. The control method according to claim 24, wherein the continuously sensing whether the external device is connected to the output port of the electronic apparatus further comprises:
   when the pull up resistor is grounded through the connecting pin, sensing that the external device is connected to the output port of the electronic apparatus.

26. A non-transitory computer readable recording medium having executable codes to perform a method of controlling an electronic apparatus having a main output part and a sub output part, the method comprising:
   outputting an image signal;
   sensing whether a predetermined external apparatus is connected to the sub output part;
   outputting the image signal to the main output part when the external apparatus is not connected to the sub output part depending on a sensing result; and
   outputting the image signal to the sub output part and stopping output of the image signal to the main output part when the external apparatus is connected to the sub output part depending on the sensing result.

27. A non-transitory computer readable recording medium having executable codes to perform a control method of displaying an image, the method comprising:
   sensing whether an external device is connected to an electronic apparatus;
   transmitting an image signal to the external device and stopping a display of the image signal at the electronic apparatus when it is sensed that the external device is connected to the electronic apparatus; and
   displaying the image signal at the electronic apparatus when it is sensed that the external device is not connected to the electronic apparatus.

28. A non-transitory computer readable recording medium having executable codes to perform a control method of displaying an image, the method comprising:
   transmitting an image signal to a display of an electronic apparatus to be displayed thereon;
   continuously sensing whether an external device is connected to an output port of the electronic apparatus; and
   when it is sensed that an external device is connected to the output port of the electronic apparatus, interrupting the image signal transmitted to the display of the electronic apparatus to stop the transmission of the image signal to the display of the electronic apparatus and transmitting the image signal to the external device through the output port of the electronic apparatus.

* * * * *